United States Patent
Gosior et al.

(10) Patent No.: US 6,684,062 B1
(45) Date of Patent: Jan. 27, 2004

(54) WIRELESS GAME CONTROL SYSTEM

(75) Inventors: Jason Gosior, Edmonton (CA); Colin Broughton, Edmonton (CA); Louis Garner, Edmonton (CA); Robert Erickson, Edmonton (CA); John Sobota, Edmonton (CA)

(73) Assignee: Eleven Engineering Incorporated, Edmonton (CA)

( * ) Notice: Subject to any disclaimer, the term of this patent is extended or adjusted under 35 U.S.C. 154(b) by 152 days.

(21) Appl. No.: 09/696,570

(22) Filed: Oct. 25, 2000

(51) Int. Cl.⁷ .................................................. H04B 1/38
(52) U.S. Cl. ...................... 455/73; 455/552.1; 455/74; 455/63.1; 455/66.1; 455/426.1; 455/67.11; 375/346; 375/347; 725/133; 725/86
(58) Field of Search ............................. 455/73, 74, 66, 455/552, 426, 466, 46, 42, 67.11; 375/346, 347; 725/133, 86, 141, 39; 348/14.03

(56) References Cited

U.S. PATENT DOCUMENTS

| | | | |
|---|---|---|---|
| 4,334,221 A | * 6/1982 | Rosenhagen et al. | ........ 180/167 |
| 4,531,740 A | 7/1985 | Green et al. | |
| 4,578,674 A | * 3/1986 | Baker et al. | ................... 341/31 |
| 4,924,216 A | 5/1990 | Leung | |
| 5,202,927 A | * 4/1993 | Topholm | .................... 381/312 |
| 5,396,267 A | 3/1995 | Bouton | |
| 5,451,053 A | 9/1995 | Garrido | |
| 5,533,010 A | * 7/1996 | Tanaka | ........................ 370/342 |
| 5,551,701 A | 9/1996 | Bouton et al. | |
| 5,605,505 A | 2/1997 | Han | |
| 5,618,045 A | 4/1997 | Kagan et al. | |
| 5,738,583 A | 4/1998 | Comas et al. | |
| 5,806,849 A | 9/1998 | Rutkowski | |
| 5,816,920 A | 10/1998 | Hanai | |
| 5,881,366 A | 3/1999 | Bodenmann et al. | |
| 6,001,014 A | 12/1999 | Ogata et al. | |
| 6,006,100 A | * 12/1999 | Koenck et al. | ........ 235/472.01 |
| 6,035,212 A | * 3/2000 | Rostoker et al. | ............. 455/351 |
| 6,042,476 A | 3/2000 | Ohashi et al. | |
| 6,071,194 A | 6/2000 | Sanderson et al. | |
| 6,078,789 A | 6/2000 | Bodenmann et al. | |
| 6,238,289 B1 | * 5/2001 | Sobota et al. | ........... 273/148 B |

FOREIGN PATENT DOCUMENTS

JP          09 149984 A       6/1997
WO         WO 99/59289      11/1999

OTHER PUBLICATIONS

"Specification of the Bluetooth System," as published by the Bluetooth Special Interest Group, vol. 1, /dec, 1, 1999, vl. 0B, pp. 41–126 and pp. 327–369.

* cited by examiner

Primary Examiner—Charles Appiah
Assistant Examiner—Marceau Milord
(74) Attorney, Agent, or Firm—Terrence N. Kuharchuk; Rodman & Rodman

(57) ABSTRACT

A wireless system for video game control comprised of a base transceiver engaged with an electronic game device where said base transceiver communicates wirelessly with one or more wireless controllers concurrently and which implements a variety of techniques to achieve significant advantages in the areas of latency, reliability, power consumption, and cross platform compatibility.

18 Claims, 7 Drawing Sheets

FIG. 11
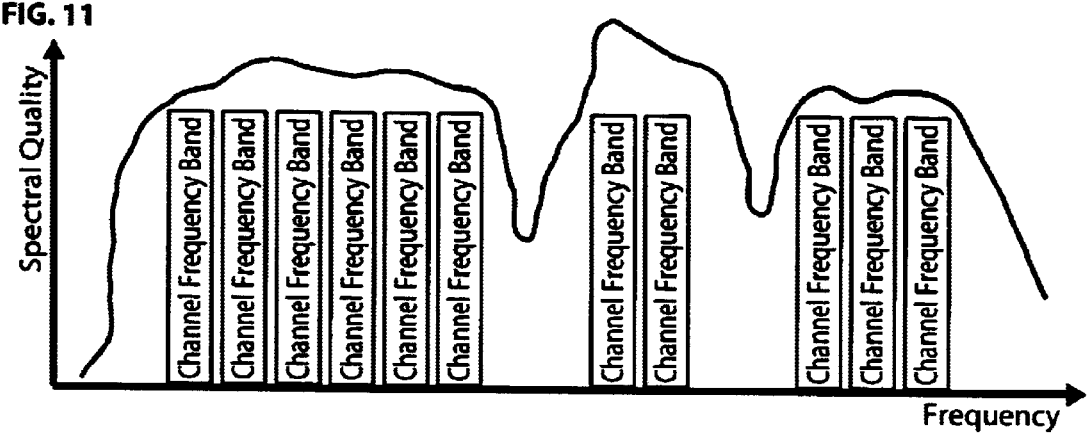
FIG. 12
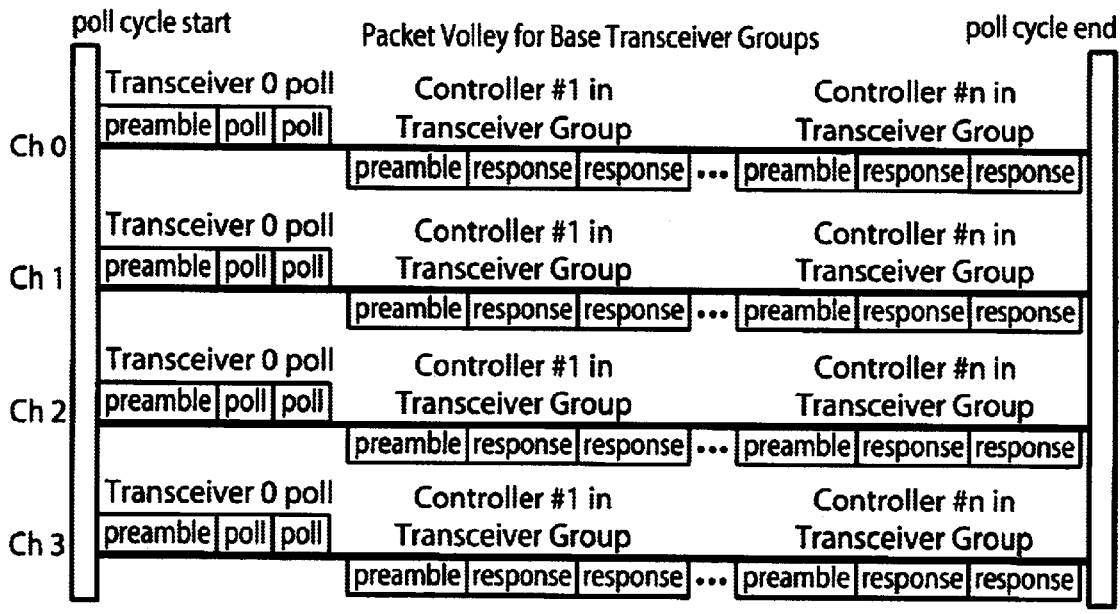
FIG. 13
| TPPH | CPH#0 | CPD#0 | ... | CPH#n | CPD#n | CRC |
- TPPH  Tranceiver Polling Packet Header
- CPH#0  Controller #0 Polling Header
- CPD#0  Controller #0 Polling Data
- ...
- CPH#n  Controller #n Polling Header
- CPD#n  Controller #n Polling Data
- CRC    Frame Check (CRC)
FIG. 14
| CRH#n | CRD#n | CRC |
- CRH#n  Controller #n Response to Poll Header
- CRD#n  Controller #n Response to Poll Data
- CRC    Frame Check (CRC)

WIRELESS GAME CONTROL SYSTEM

BACKGROUND OF THE INVENTION

The invention relates to the field of handheld video game controllers and wireless data transmission between the controllers and an electronic game device. More particularly, the invention relates to a low power wireless system integrating digital, analog, radio frequency (RF) and firmware devices to transmit control and data packets between different game controller devices and electronic game devices.

Electronic game programs operate on various electronic game devices. Electronic games use software and hardware devices to simulate game situations and experiences through visual, audio and mechanical stimuli. User interaction with these games is provided through a hand operated controller which permits the person to change the game direction or response and also to receive mechanical, audio or visual feedback from the game device. Many electronic games are fast moving and draw the user into fast moving responses which integrate the person into the game. Popular games require fast reflexive responses to the game situation and format and require the transmission of large data sets. Any interruption of such games is disruptive to the person's enjoyment and is highly undesirable.

Different competing vendors distribute multiple controller types incompatible with other game systems. Manufacturing companies plan system incompatibility to preclude operation of competing games on the system architecture. Conventional game controllers are typically hard wired to a hardware controller.

U.S. Pat. No. 5,451,053 to Garrido, (1995) described an electrical method for re-routing electric signals from a video game controller by a wired connection to a video game system. This system attempted to fit a fixed controller type to multiple games for a specific target video game system. U.S. Pat. No. 5,551,701 to Bouton et al. (1996) described a hard wire video game system with a fixed,controller configuration wherein the functions of the controllers can be reconfigured to suit an individual user's preference. U.S. Pat. No. 5,396,267 to Bouton et al., (1995) described a wired controller for game system configuration. U.S. Pat. No. 6,071,194 to Sanderson et al., (2000) described a hard wired controller wherein controller functions could be reconfigured to suit an individual user's preference and to match the supported functions to target game applications.

Wired controllers are capable of reliable and fast signal communication, however such controllers require wires leading from the controller to the electronic game device. Wires not only limit the operating mobility of the user relative to the electronic game device but they also present a safety hazard because they can be tripped over.

To avoid the disadvantages inherent in wired systems, certain game control systems transmit data signals using infrared ("IR") emitters and detectors. IR technology is conventionally used in remote control devices for televisions, stereos, and garage door openers. IR technology is undesirable for video game control because a moving person or pet can interrupt the communication link between the controller and the electronic game device. A controller using IR technology must be pointed directly at the receiver to maintain the communication link, and transmission can be easily interrupted by the normal movement of the user during game play. Additionally, IR transmission is susceptible to interference from other IR devices and from fluorescent lighting. Although IR light can be modulated, the number of effective communication channels within a single room is limited.

Various handheld game controllers have been developed. For example, U.S. Pat. Nos. 6,078,789 to Bodenmann et al. (2000) and 5,881,366 to Bodenmann et al. (1999) disclosed an RF wireless gaming system. The data transmission architecture in such systems was inherently limited and prevented additional signals from being transmitted after the system capacity was reached. Another wireless controller was disclosed in U.S. Pat. No. 5,605,505 to Han et al. (1997), which described a two controller infrared wireless system. The Han controller described a fixed controller to electronic game device pairing and was subject to the IR limitations described above.

In addition to IR transmission, other systems have attempted to use radio frequency ("RF") transmission in game environments. U.S. Pat. No. 4,531,740 to Green et al (1985) disclosed a remote controller system for a video computer game using RF transmission as a communication mechanism. The Green system was for a fixed, application specific controller and electronic game device configuration and did not provide for other uses. U.S. Pat. No. 5,806,849 to Rutkowski (1998) described a long range signal transmission system which depended on multiple channel transmission frequencies and used a single receiver to poll individual channels.

U.S. Pat. No. 5,618,045 to Kagan et al, (1997) described an all-to-all controller gaming network using an arbitrary wireless network (IR, RF or acoustic) and special purpose gaming controllers and did not support multiple types of controllers or electronic game devices. U.S. Pat. No. 6,001, 014 to Ogata et al. (1999) described a controller and game system where bidirectional signals are transmitted via a wired interface. International Patent Number WO 99/59289 to Yamamoto et al. (1999) described a controller and game system where bidirectional signals are transmitted via a wired interface and where several wired controller types are supported.

Different data protocols have been developed to facilitate data transmission wirelessly. For example, Bluetooth Specification version 1.0B, an open standard promoted by the international Bluetooth Consortia, defines a short distance voice and data wireless data transfer system providing master/slave relationships, polling, frequency hopping and signaling.

SUMMARY OF THE INVENTION

The invention provides a modular architecture for short range, radio frequency wireless system for operating an electronic game device. The system comprises a base transceiver engaged with the game device, a controller for transmitting RF wireless signals to the base transceiver, wherein said controller has selected operating characteristics transmittable by the RF wireless signals, a microprocessor engaged with the base transceiver for receiving said RF wireless signals, wherein the microprocessor is capable of identifying the selected operating characteristics of the controller and of modifying operation in response to such selected operating characteristics.

BRIEF DESCRIPTION OF THE DRAWINGS

FIG. 11 illustrates the selection of radio frequency channels in radio frequency spectrum bands having sufficient spectral quality to support signal transmission.

FIG. 12 illustrates a packet volley sequence between multiple base transceivers and multiple controllers.

FIG. 13 illustrates a poll packet format for gaming applications.

FIG. 14 illustrates a response packet format for gaming applications.

DESCRIPTION OF THE PREFERRED EMBODIMENTS

The invention provides a unique solution overcoming limitations of wireless IR game controllers. The invention provides a common framework to allow interoperation of multiple types of wireless controllers with multiple electronic game device types. Each game controller can be designed once and reused across multiple electronic game devices, and the gaming user can use their "favorite" controller for multiple game devices.

Figure 1:
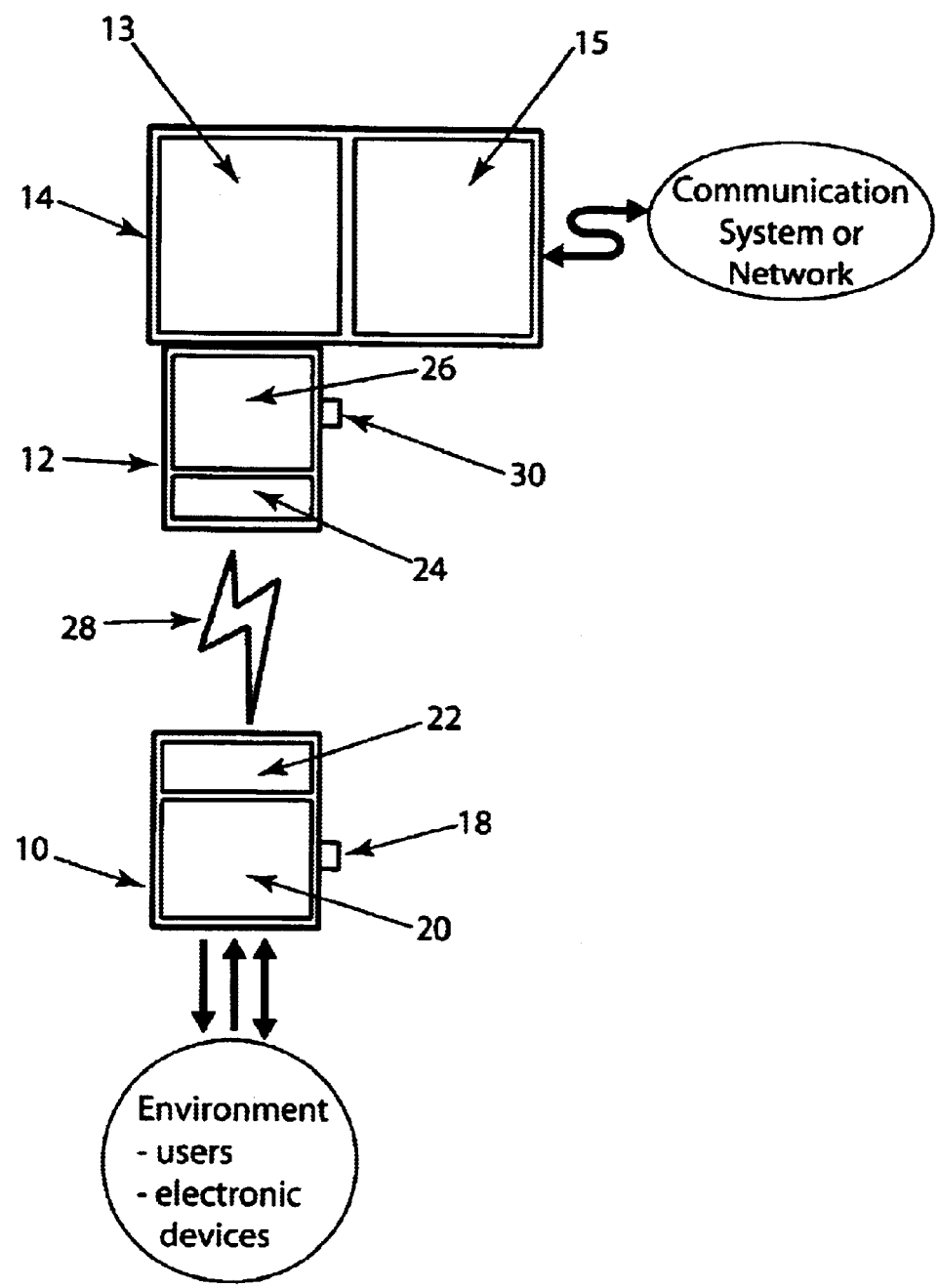
FIG. 1 illustrates overall system components for an RF game control system.
Figure 2:
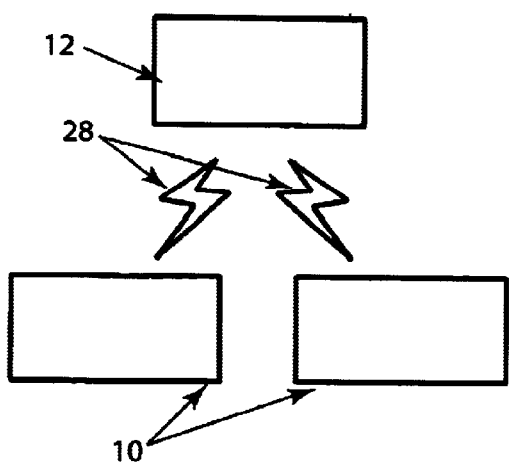
FIG. 2 illustrates the master-slave relationship of base transceivers to controllers.
Figure 3:
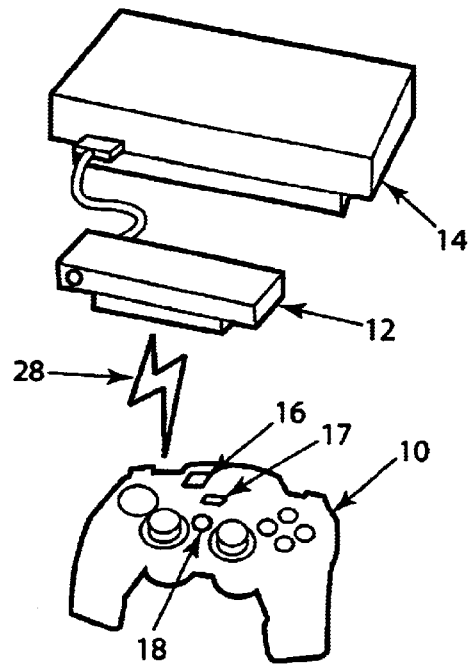
FIG. 3 illustrates a typical video game system physical implementation.

Referring to FIG. 1, the system architecture generally comprises hand operated game controller 10, base transceiver 12, and electronic game device 14. Although FIG. 1 illustrates an architecture for a game controller 10, such architecture is applicable to other utilizations including computers, communications systems, and other devices. For wireless radio frequency transmissions, the system is arranged in a master-slave configuration, as shown in FIG. 2, with base transceiver 12 acting as the master and controllers 10 acting as the slave. A typical commercial video game system implementation is illustrated in FIG. 3, wherein controller 10 is linked through RF transmission with base transceiver 12 and electronic game device 14. Controller 10 includes bond key 16, program key 17, and link status light 18 as further described below.

Controller 10 comprises a portable, hand operable remote component linked to electronic game device 14 through a radio frequency (RF) wireless connection. Controller 10 includes two subsystems defined as controller input/output subsystem 20 and controller RF module 22. Controller input/output subsystem 20 comprises an interface between game device 14 and the user or an appended electronic device such as a game peripheral, plug-in expansion module, or data port to an electronic data device. Controller input/output subsystem 20 can comprise electronic devices to support one or more of: (i) digital and analog game control input keys and joysticks; (ii) audio input and output devices (speakers, microphones); (iii) video input and output devices; (iv) touch, position, movement and other environmental sensors, v) mechanical feedback devices such as vibrating motors; (vi) entertainment device control keys having various functions such as stop, play, pause, fast forward, reverse, TV, and VCR control functions; (vii) computer keyboards and touch pads with embedded processors, (viii) data interfaces; (ix) controller expansion modules; and (x) any number of similar interfaces for channeling environmental stimulus or input into the system and for providing feedback to the user or appended electronic device.

Controller RF module 22 manages the transmission of data between controller 10 and base transceiver 12. As a visual indicator of RF link status controller RF module 22 contains a link-status light emitting diode ("LED") 18 used to show status information for a controller-to-base transceiver RF transmission channel.

Figure 4:
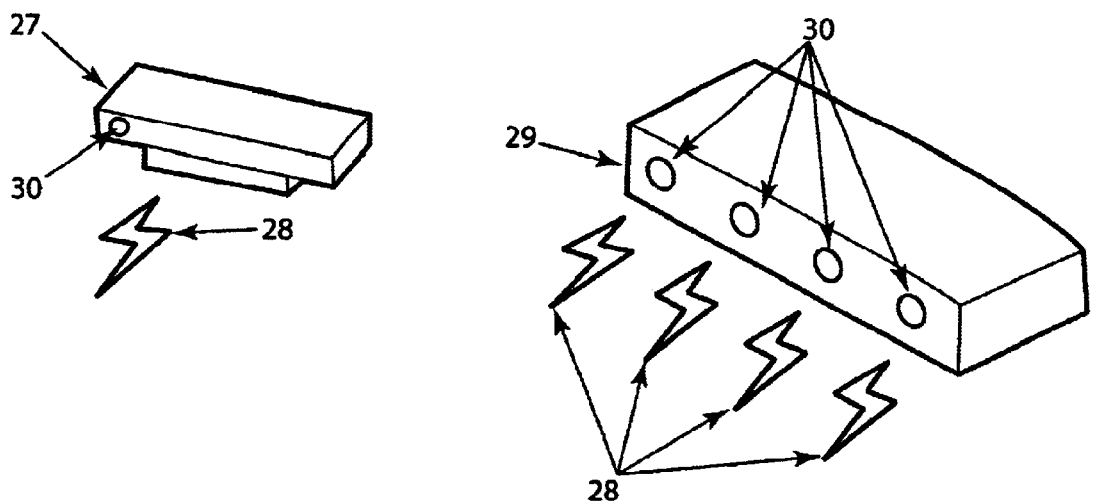
FIG. 4 illustrates a single RF port configuration and a multiple RF port configuration of the base transceiver.

Base transceiver 12 comprises a communication translation device. Base transceiver 12 comprises two subsystems defined as base transceiver RF module 24 and base transceiver host device interface 26. Base transceiver RF module 24 receives or transmits data to and from controller RF module 22 in a one port configuration 27 using a virtual RF connection identified as RF port 28. Base transceiver 12 also has a bonding light 30 which is used to show status information for individual controller-to-transceiver connections. Base transceiver RF module 24 may have a single RF port 28 per module in a one port configuration 27 or multiple RF ports 28 per module in a multi-port configuration 29 as shown in FIG. 4. For single RF ports 28 a single channel frequency is used. For multiple RF ports 28 multiple linked controller signals are time multiplexed on a common channel frequency or in another embodiment on additional channel frequencies to increase overall capacity.

Base transceiver host interface 26 translates controller 10 commands into commands understood by connected electronic game device 14 and vice versa. The entire base transceiver 12 can comprise a physically separate device, can be plugged in to electronic game device 14 through a wire connection, or can be totally integrated into electronic game device 14.

Electronic game device 14 comprises an electronic game device core system including the computer upon which a game program is hosted. Image display is provided by a television, computer monitor or similar display device. Electronic game device 14 is also responsible for coordinating the activities of integrated audio and video entertainment devices or communication devices 15 or for controlling the interfaces connected to external devices or networks. The audio and video subsystem consists of integrated consumer electronics such as DVDs, cameras and other devices. The communication subsystem can manage interfaces to external devices such as ethernet, USB or similar multiple purpose interfaces.

Although initial implementations of the system architecture are targeted to electronic gaming systems such as electronic game device 14, it may also be extended by substituting electronic game device 14 with a compatible computer or communications device and by using a more generic data transmission component of the architecture protocol. Wired connections can be replaced by wireless RF links and high level protocols required for computer or communications data transmission can be encapsulated in low level wireless data transport provided by the system architecture.

Many possible product configurations can be supported by the system architecture. The term "vendor" as used herein refers to a product designed and produced by an entity conventionally incompatible with products produced by other entities for market differentiation or other purposes. The following "gaming" configurations are representative combinations of one or more controllers 10 and base transceivers 12.

1) Single Port Transceiver—Single Vendor

Figure 5A:
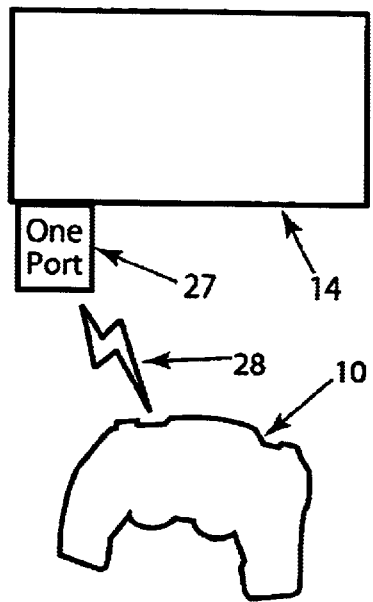
FIG. 5a illustrates a single one port base transceiver and single controller configuration.
Figure 5B:
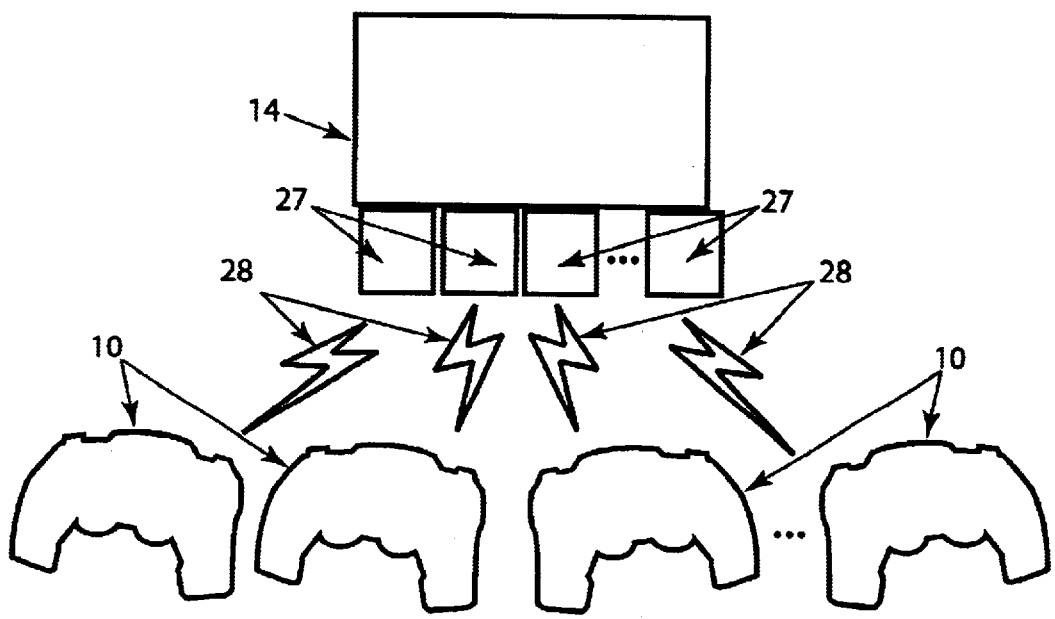
FIG. 5b illustrates a multiple one port base transceiver and multiple controller configuration.

The system supports both single-player and multi-player scenarios, represented in FIGS. 5a and 5b, with single port base transceivers 27 each linked between game device 14 and each controller 10.

2) Multiple Port Transceiver Operation—Single Vendor

Figure 6A:
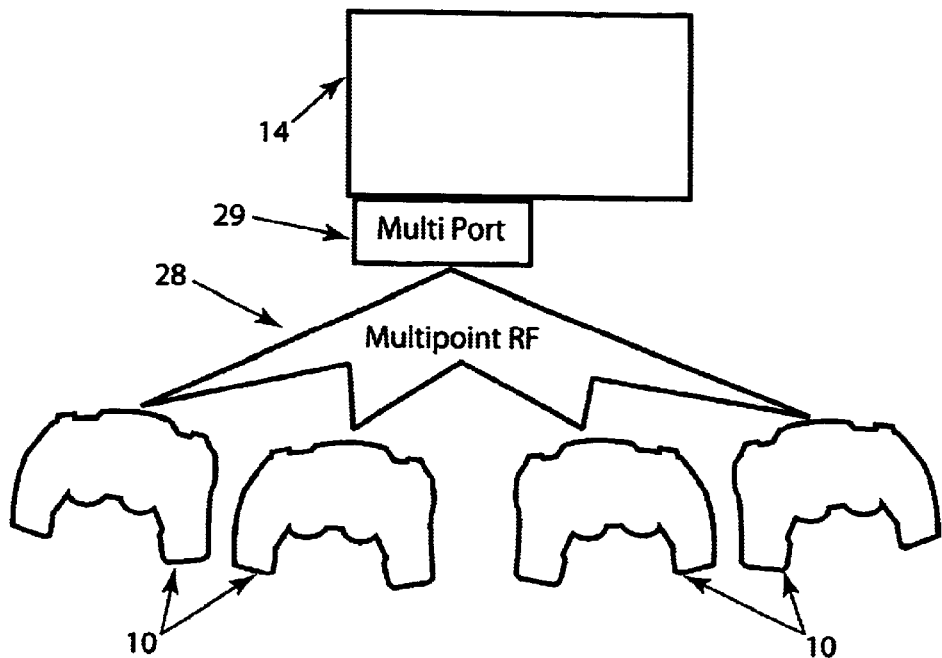
FIG. 6a illustrates a single multi-port base transceiver and RF multi-point communication link to multiple controllers.
Figure 6B:
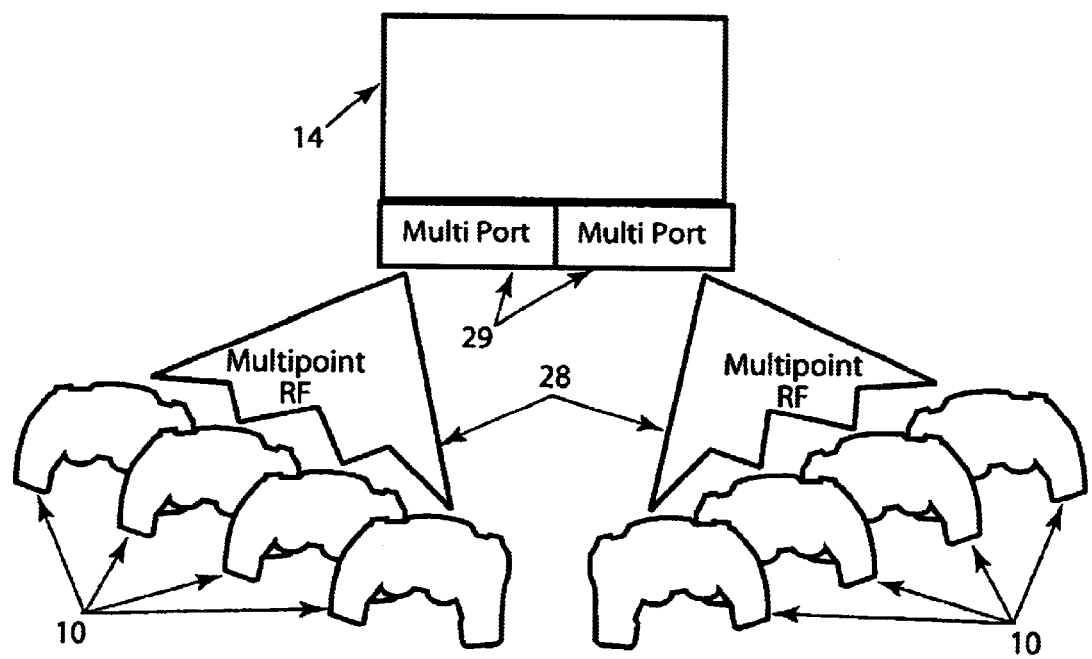
FIG. 6b illustrates multiple multi-port base transceivers and RF multi-point communication links to multiple controllers.

The system supports both single-player and multi-player scenarios, represented in FIG. 6a with a multi-port base transceiver 29 and in FIG. 6b with multiple multi-port base transceivers 29.

3) Multiple Vendors

Figure 7:
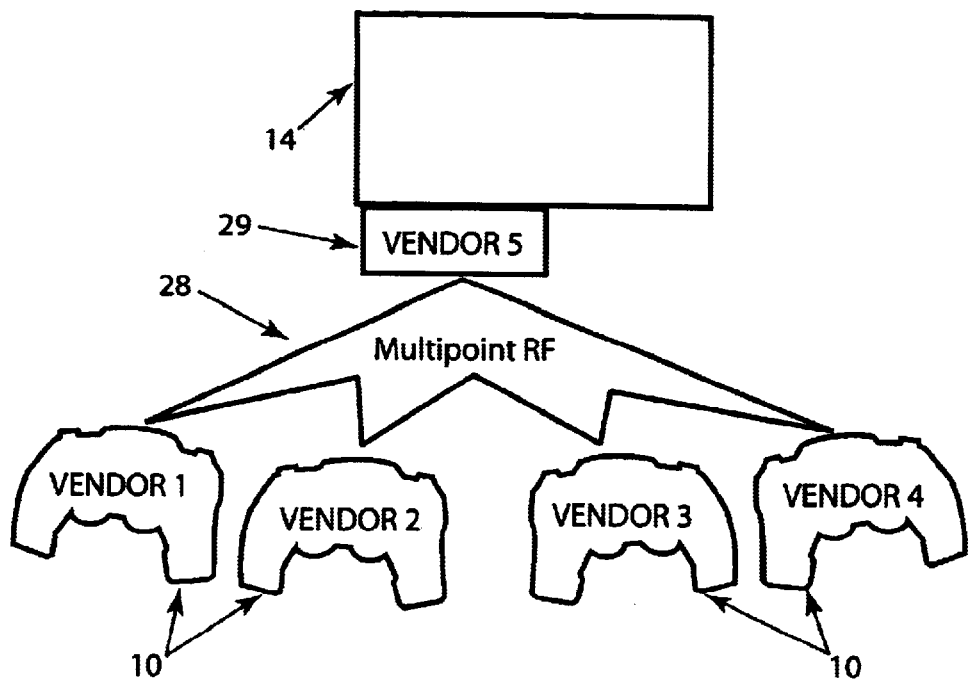
FIG. 7 illustrates a multi-vendor multi-port base transceiver and multi-vendor controller configuration.

FIG. 7 illustrates operation of a multi-port base transceiver 29 in communication with game controllers 10 provided by different vendors.

4) Multiple Type

Figure 8:
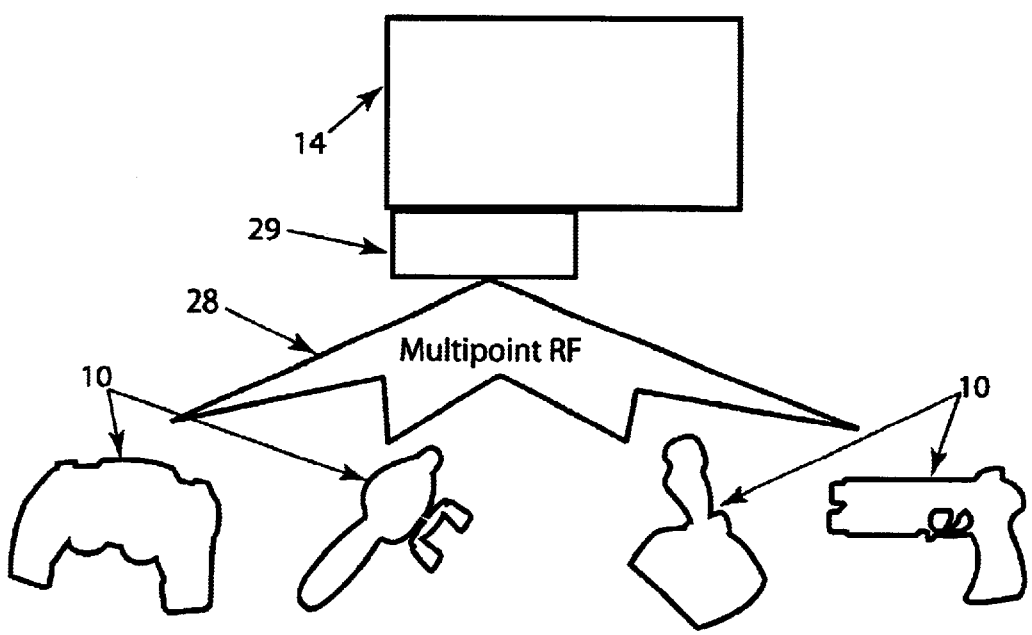
FIG. 8 illustrates a single multi-port base transceiver with multiple controller types configuration.

FIG. 8 illustrates a mixed type environment supporting different types of controllers 10.

5) Cross Platform

Figure 9:
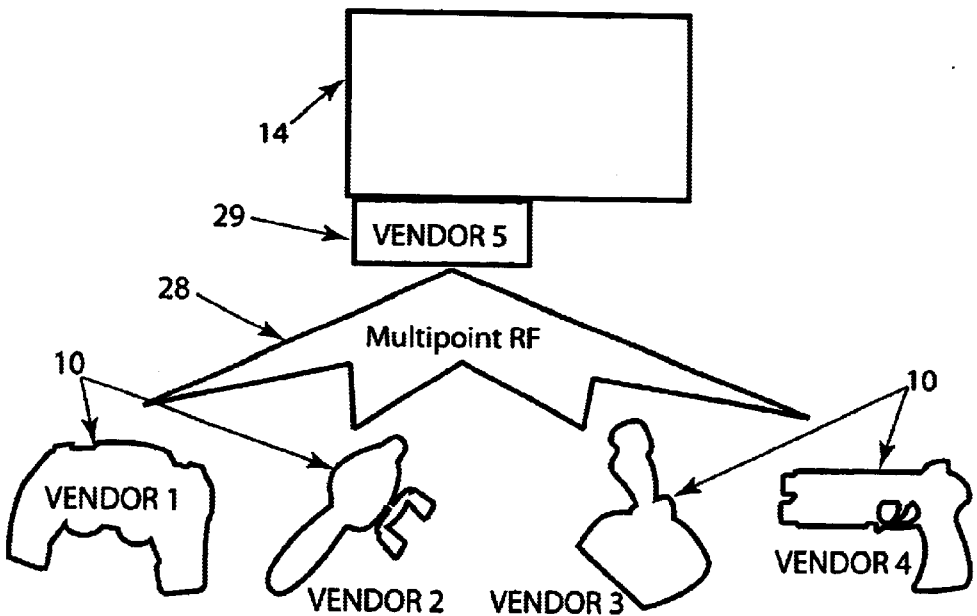
FIG. 9 illustrates a multi-vendor multi-port base transceiver with multi-vendor multiple controller types configuration.

Architecture compliant controller devices created for one game system may be used with multi-port base transceivers 29 connected to a different game electronic device 14 as shown in FIG. 9.

The utility of each controller 10 depends on what mappings of its input/output functions are possible for the target electronic game device 14 and resident electronic game software. The degree of compatibility will be determined by the overlap of functionality between the nonstandard controller and a standard controller for a given electronic game device 14.

Figure 10:
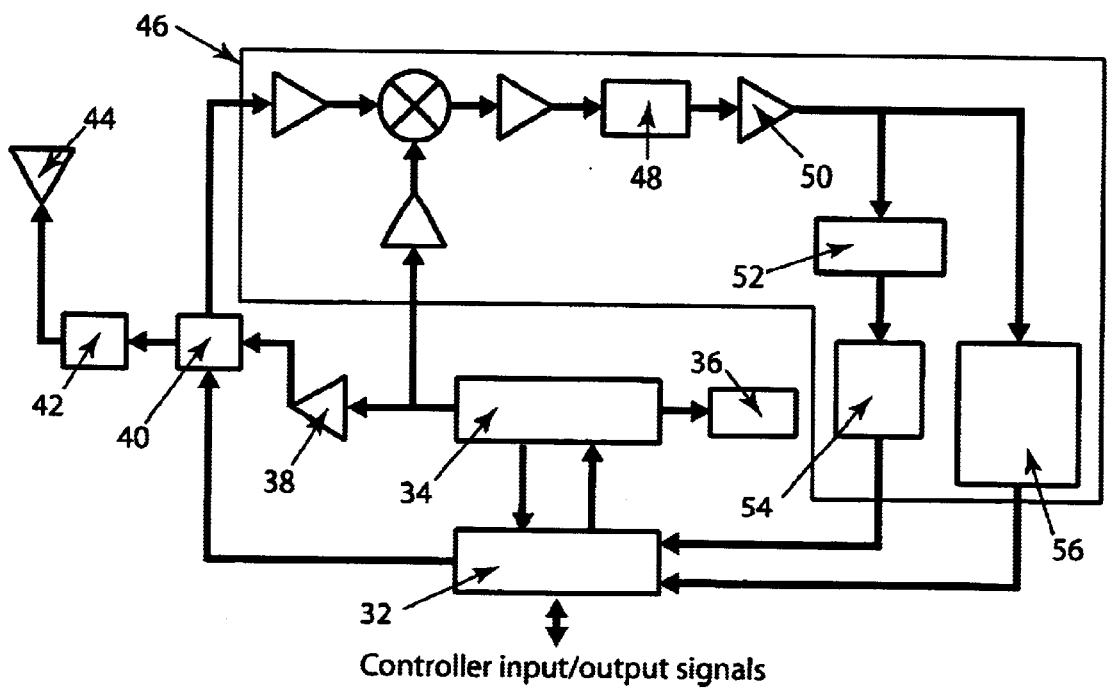
FIG. 10 illustrates a representative radio frequency system design.

As shown in FIG. 10, the RF system design is used in either controller RF module 22 or base transceiver RF module 24 to both transmit and receive signals and to detect signal strength. All operations of the RF section are under the control of a central microprocessor 32. Although a frequency shift keying (FSK) modulation technique is described, other modulation and encoding techniques could also be used.

Microprocessor 32 controls modulator 34 and oscillator 36 to generate a transmit frequency shift key signal. The signal is amplified with amplifier 38 and is controlled by RF switch 40 which controls the half duplex signal transmission. During transmission RF switch 40 allows the transmit signal to pass out of the system through bandpass filter 42 and antenna 44. Bandpass filter 42 is used at the output prior to antenna 44 for harmonic suppression and image frequency removal.

When a signal is received, RF switch 40 allows the signal to pass into receive section 46. Using super heterodyne techniques, the signal is reduced to an intermediate frequency (IF) where filter 48 removes adjacent channel frequencies. Next the signal is amplified with amplifier 50 and passed through demodulator 52. The digital signal is then extracted using a post detection filter and data slicer circuit 54 and is sent to microprocessor 32.

Also shown in the diagram is a received signal strength indicator (RSSI) 56 used by microprocessor 32 both to determine the received signal strength (for power control) and to act as a RF carrier detect to sense when a new RF transmission has been originated. The receive power is compared against the standard and this information is passed up to the next protocol layer where packet fields are used to carry power level information to dynamically adjust power levels of transmitting devices. Transmission frequencies are organized by channels. Each RF system uses a group of channels called "palettes" for transmission purposes. Channels in channel palettes are automatically replaced if one of the channels in a palette becomes bad. The circuitry of RSSI 56 can help determine if a channel is going out of tolerable transmission specifications.

Data is transferred over the RF Ports 28 between base transceiver 12 and controller 10 pairs using a synchronized polling process. To avoid transmission signals from adjacent base transceivers 12 saturating a non-transmitting transceiver 12, the polling process is also synchronized across multiple transceivers 12 (see FIGS. 5b and 6b for multiple transceiver examples). This is achieved by base transceivers 12 and controllers 10 listening to transactions of adjacent base transceivers 12, by a designated primary base transceiver 12 broadcasting a synchronization signal periodically, or by use of similar detection and coordination method. Between synchronization events, each of the controller RF modules 22 and base transceiver modules 24 use internal clock oscillators to maintain polling synchronization.

The invention provides unique RF control over game operation by using the radio frequency system physical components such as controller RF module 22 and base transceiver RF module 24 together with bit transmission and connection methods ("bonding") and the electronics associated with providing the controller functions and the base transceiver functions.

Controller I/O subsystem 20 supports base functions and may be expanded to include other types of mechanical, audio, video and data functions in addition to the following:

analog and digital keys and joysticks backhaul—support for multiple vibration, force, audio, and feedback devices Joysticks—support for multiple analog joysticks each w/tactile switch Analog Support—four joystick axes and twelve pressure-sensitive keys and spares.

Programmable features such as auto repeat and remapping of controller input functions (e.g. keys function remapping).

entertainment remote controls—e.g. DVD/CD, TV controls.

The RF signal specification preferably operates in a range between 905 and 928 MHz, and the frequency spectrum is broken into up to forty concurrent channels or more. Although this is the initial frequency range supported, all techniques and features described are equally applicable in other frequency ranges of sufficient spectral width or in ranges where the number of channels is changed to fit the available spectrum.

The center frequencies of channels are selected dynamically and updated continuously for optimal low noise and acceptable signal transmission performance across the allowable transmission spectrum. Center frequencies are not necessarily evenly spaced given they are optimized for best transmission performance, but maintain a minimum spacing to avoid channel spectral overlap as illustrated in FIG. 11.

Each base transceiver 12 selects a starting "channel palette" of up to four or more channel frequencies. Such selection is coordinated with the channel frequencies of other base transceivers 12 and controllers 10 which are in range. During initial palette set up, the base transceiver 12 and associated controller 10 both scan the available frequency band and listen for radio frequency energy levels using their RSSI 56 feature. The palette center frequencies are selected from areas of low radio interference (high signal quality) as measured from both base transceiver 12 and controller 10.

As a given base transceiver 12 transmits, it can select and cycle through palette frequencies in a coordinated fashion with its associated controllers ("frequency hopping"). Alternatively, base transceiver 12 may use any of the channel frequencies in its palette in a static fashion and only change to other channels if the static channel becomes unusable. The system automatically finds replacement channel frequencies if one of the channels in its pallette becomes bad. CRC error checking (from a higher level layer in the system), RSSI 56 signal measurements and other methods (such as calculated distortion metrics) are used to determine channel quality.

Multiple controllers 10 are operable by a given electronic game device in an immediate area without interfering with each other. Each channel carries data in both directions using a duplex transmission method.

The RF carrier can be modulated using FSK (Frequency Shift Keying) and encoded using bit randomization or other technique for DC offset minimization and other desirable characteristics. The system has a base data rate of 57.6 kbps with extensions to beyond 1500 kbps. More sophisticated and frequency efficient modulation and encoding techniques can also be used for higher bit efficiency and when other design specific transmission quality, signal power, bit-error or bit-rate attributes are required (e.g. QAM, QPSK, spread spectrum etc.)

The maximum output power of the controller is preferably negative 2 dBm or positive 650 microwatts, but this may vary depending on the modulation and encoding techniques and operating frequency ranges selected. The system operates at low transmission power to fit within FCC Part 15 (USA) and RSS 210 (Canada) regulations for Low Power Unlicensed Devices. The system has a basic transmission range of 10 meters with extensions to 25 meters or beyond with commensurately higher bit error rates and/or power level. The controller 10 and base transceiver 12 antennas such as antenna 44 are typically entirely enclosed because of the frequency range chosen. Such antennas are realized on the relevant printed circuit boards (PCB) as a microstrip antenna or by a short mechanical antenna structure.

The properties of the RF circuitry utilized by controller 10 and base receiver 12 impact the design of an appropriate bit-level transmission protocol. The RF protocol should:

reliably transport status information from controllers 10 and base transceivers 12;

minimize signalling latency;

allocate and manage a set of RF channels using both frequency division and time division multiplexing;

detect packet errors and initiate appropriate recovery actions; and scan for and circumvent noisy segments (including intermittent noise) of the frequency band.

As shown in FIG. 12, base transceivers 12 poll their associated controllers 10 nearly simultaneously. Following the packet volley, base transceivers 12 listen for their associated controller responses on their individual channels. Poll and response packets to each controller 10 for a given base transceiver 12 are time division multiplexed. Since each volley from each base transceiver 12 is on a different channel frequency, the polling process for all connected groups of controllers 10 can occur in parallel. Both poll packets and response packets can be transmitted in pairs (optional) to increase the reliability of the radio link. The packet preamble conditions the system electronics to prepare for data transmission.

The invention uniquely provides for dynamic bonding of each controller 10 with an associated base transceiver 12. "Bonding" is a process by which controllers 10 are wirelessly linked to a given base transceiver 12 and the system learns the capabilities of a new controller 10. The bonding process is divided into three steps. First, controller 10 finds an available RF port 28 on base transceiver 12 and a controller address is sent to base transceiver 12 to save this association. Second, base transceiver 12 provides the available channel palette information to controller 10 and potentially adjusts its palette by changing one or more palette frequencies if transmission to new controller 10 is impaired on one or more of the channel palette frequencies. Finally, in a "feature negotiation" step, the capabilities of controller 10 are shared with base transceiver 12 which adapts controller 10 data signals to most closely match the characteristics of the electronic game device 14. Feature negotiation is performed in the adaptation layer.

Controllers 10 and base transceivers 12 are "dynamically bonded" when controller 10 powers up and whenever the bonding key 16 located on controller 10 is operated by a user. Base transceiver 12 keeps a record of its last mated controller or controllers 10 and will bond to that controller 10 first if more than one controller 10 is available during such search.

As a visual bonding indicator, bonding light or lights 30 such as forward facing colored LEDs are built into base transceivers 12. When a base transceiver 12 bonds to a controller 10, base transceiver 12 emits a one second burst of light at 10 Hz. During such initial bonding "burst", the link-status light 18 on controller 10 mimics bonding light 30 on the matching base transceiver 12 port, also with a one second burst at 10 Hz. At all other times link-status light 18 provides a visual indication of link quality by representing channel signal quality and signal presence by making an on-duration or brightness proportional to the percentage of good data transfers between controller 10 and base transceiver 12. Each bonding light 30 has two basic purposes—to indicate that bonding has successfully happened and to indicate to which RF port 28 controller 10 has bonded.

Operation of bonding key 16 rejects the currently bonded RF port 28, causing another RF port 28 to bond with controller 10. Holding down the bonding key 16 causes controller 10 to toggle through all available RF ports 28, with each RF port 28 bursting the corresponding bonding light 30 when a successful bond has occurred. The user releases bonding key 16 when the controller 10 has bonded with the desired RF port 28.

An adaptation layer acts as an intermediary between the application and RF layers. The adaptation layer handles the feature negotiation step of dynamic bonding and data packetization such as translation, compression, or data verification. When a new controller 10 is bonded to the system it must inform the system about its capabilities so base transceiver 12 can translate and match signals passing between electronic game device 14 and the new controller 10. This step of dynamic bonding is referred to herein as "feature negotiation". This capability of the invention permits each controller 10 to be manufactured by the same manufacturer of the electronic game device 14 or to be manufactured by another manufacturer. Similarly a new controller 10 from another electronic game device can be used with electronic game device 14 and the functions of the new controller 10 can be mapped to support the games resident on the new electronic game device. In yet another case, each controller 10 may be of a new type.

Feature negotiation can be achieved using one or a combination of techniques such as:

1) Standard codes and profiles representing classes of controller 10 and host types where key and input functions are clearly defined and can be passed from controller 10 to base transceiver 12 to establish a standard default configuration;

2) A "body mapping" convention can be used where the fingers on the hands and selected body areas (e.g. head, chest, shoulder, elbow, knee, ankle, eye, mouth etc.) are mapped to functions on the selected controller 10 and these functions are mapped to the functions required for a given electronic game device 14. In this way basic game controller functions are the same or similar, regardless of which electronic game device 14 the person desires to use. This greatly reduces the learning curve when using controllers 10 on multiple electronic game devices 14. Information about the "body mapping" is transferred to base transceiver 12 so it can perform a standard input device mapping for the target electronic game device 14; and 3) Using a controller programming key or an application-based graphical user interface, the controller button inputs can be remapped by the user to suit the target electronic game application.

If during the function mapping process whenever a given RF channel is nearing its data carrying capacity and the addition of features from a newly introduced controller 10 threatens to exceed that capacity, additional feature negotiation occurs between those controllers 10 connected to a given base transceiver 12. The base transceiver 12 needs to either downgrade feature support for the added controller 10 or reduce feature support across multiple controllers 10. This process is coordinated by base transceiver 12 working in conjunction with its associated controllers 10.

Within each polling cycle base transceiver 12 sends a poll packet and controllers 10 will respond with response packets as shown in FIG. 12. The adaptation layer defines the format, of these packets. Packet formats and types may be extended or modified to support different electronic game devices 14, different controllers 10, data transmission modes or other applications.

The poll packet, as shown in FIG. 13, is sent by base transceiver 12 to initiate the polling volley. Since the poll packet is sent once per packet volley it contains information relating to each of the associated controllers. Within each polling cycle each controller 10 will send a response packet as shown in FIG. 14. The poll packet has several components:

TPPH—Transceiver Polling Packet Header

The TPPH is the overall header for the polling packet. It contains packet type, polling control (e.g. flow control, redundant packet flag) and base transceiver address, other channel address information. It may contain other application dependent fields for other data and protocol control purposes.

CPH#n—Controller #n Polling Header

The CPH is a sub-header in the polling packet. Each controller 10 being addressed by base transceiver 12 preferably has a separate CPH and CPD component containing data type, data address, and data control (e.g. quality of service, size) information and RF link control (e.g. transmit and receive power level fields to adjust power levels dynamically) information.

CPD#n—Controller #n Polling Data payload

Each controller 10 associated with a base transceiver 12 is sent information relating to the particular application. Gaming and generic data payload characteristics are described below.

CRC—Cyclic Redundancy Checking

The data packet is protected with a CRC-16 (or better) frame check (x16+x12+x5+1).

The response packets from each individual controller 10 have several components:

CRH#n—Controller #n Response to Poll Header

The CRH is a header for the controller 10 response to a base transceiver 12 poll packet. Each controller 10 must send a response to the poll request made by base transceiver 12 containing data type, data address, and data control (e.g. quality of service, size) information and RF link control (e.g. transmit and receive power level fields to adjust power levels dynamically) information.

CRD#n—Controller #n Response to Poll Data payload

Each controller 10 sends data to its associated base transceiver 12 using this field. Gaming and generic data payload characteristics are described below.

CRC—Cyclic Redundancy Checking

The data packet is protected with a CRC-16 (or better) frame check (x16+x12+x5+1).

Game data payloads can be divided into feedback signals coming from electronic game device 14 to controller 10, such as controller motor signals carried by the CPD field of the poll packet. Input signals coming from controller 10 to electronic game device 14 are carried in the CRD field of the response to poll packet.

If sufficient RF wireless transmission capacity exists, the analog information relating to motor control, joystick position, button pressure or other analog input device can be represented directly up to the resolution of the analog to digital converter or can be compressed using vector quantization where the amount of data exceeds the data capacity of the RF channel. For example, the high-speed motor control could be represented by 8 bits uncompressed data or dynamically compressed to 2 bits, while the low-speed motor control might be 10 bits uncompressed or compressed to 6 bits as required.

Digital button information is represented by a binary button vector. For twelve digital buttons on controller 10 this vector is typically twelve bits long. Additional bits may be allocated per digital input device depending on its attributes.

As the number of active analog buttons rises, button resolution gradually decreases from 6 bits/button down to as low as 3 bits/button. For the base implementation, analog bandwidth is fixed at 56 bits per response packet, but this might be increased or decreased as driven by the data requirements of the target set of controllers to be supported by the architecture. Analog button data is transmitted in the same order as the corresponding binary button-vector bits. The type of data representation varies by analog input type e.g. a simple analog button is represented by a simple bit sequence, whereas an analog joystick is represented by x and y coordinate information. When fewer than 5 analog buttons are active, the unused fields are ignored.

Generic data transfer can be used for transferring game-related data, for updating controller firmware, or for general computer and communications applications. Higher level protocols (e.g. TCP/IP) utilized for gaming, computer, communications and other applications are encapsulated in the data payload. The data payload is of variable length to accommodate applications with variable length data unit requirements and additional control and protocol parameters. Data packets can be interspersed with game packets or transmitted when game packets are not being sent (e.g. between games) or can exist separately (e.g. data only applications).

Within the data payload, additional control and protocol parameters (one byte or more) may be embedded to further extend capabilities of data transmission such as sequence numbers, additional embedded protocols and mediation layers. The size of the parameter portion of the payload depends on which features are supported for the given data packet type. The number of bytes in a packet depends on the payload size settings found in the controller header (CPH or CRH) and is bounded by the transmission rate possible by the system. The faster the transmission rate, the more bytes per polling cycle can be accommodated.

An application layer controls high level functions relating to external world interfaces and system-wide functions. The application layer manages the controller input/output subsystem in the controller and mediation of signals between the base transceiver and the electronic game device.

Controller I/O subsystem 20 polls various controller input devices such as analog and digital keys, joysticks, other external interfaces, for user or external input and transmits the results to base transceiver 12 for use by electronic game device 14. The subsystem also receives information from electronic game device 14 to provide feedback to the user or external devices such as motor control, control and data signals to external devices.

User programming features of functions such as remapped key functions and macros to repeat key sequences automatically are also supported by this controller I/O subsystem 20. Any of the triggers, control keys or other input interface supported by the controller I/O subsystem 20 electronics may be put into or removed from an "auto repeat" mode using the "program" key 17 as shown in FIG. 3. When auto repeat is enabled on a key, the pressed key will automatically repeat at 10 Hz when operated by the user.

Any compatible input devices may be remapped to one another or swapped using a hold and release sequence of "program" and trigger and/or controller keys. For example analog keys sensing and converting pressure into a multi-level digital signal may be remapped to joysticks and conversely. The sensitivity of analog keys may also be adjusted and the vibration mode of controller motors selected by controller 10.

All user programming features are set to defaults values at power-on, but the last five or more programmed configurations ("save sets") are stored in non-volatile memory and may be recalled by the user. The first of these "save sets" is stored automatically, additional "save sets" may be stored manually up to the memory capacity of the controller.

Entertainment system functions built into the electronic game device are controlled by remapping the existing controller keys or in the case of a stand-alone special purpose entertainment wireless RF remote controller by using a subset of the defined button fields in the game protocol payload definition. If wireless RF remote controller 10 has more buttons than supported by the basic game controller, a data-oriented packet method may be used or additional gaming-related fields may be defined.

Base transceiver 12 mediates and converts signals between controller 10 and electronic game device 14 to ensure compatibility. Base transceiver 12 also can control the sub-functions of bonding new controllers 10 to base transceivers 12 and the associated mapping of new controller types to new or existing electronic game devices 14.

Electronic gaming devices can include integrated entertainment and communication features such as DVD, internet connectivity, telephony, and video conferencing. Controller 10 can incorporate various entertainment control, communication control and data capabilities suitable for providing ethernet interface, portals for internet appliances, personal digital assistance, and audio, tactile and visual interfaces such as microphones, speakers, video displays, video cameras, data ports, and VR-virtual reality devices.

Because wireless gaming controllers provide increasingly diverse and sophisticated functionality, the wireless controller architecture provided by the invention coordinates and supports differing controllers 10 as an interface with differing electronic game devices 14. The invention allows interoperation of any game controller 10 with any electronic game device 14 by means of a common layered protocol which mediates data connections and the content/presentation format of the data structure. The data format from a given controller 10 may need to be modified to be correctly interpreted by a given electronic game device. The reconfiguration is automatic in nature via a feature negotiation process and is adaptable to many more configurations permutations on many different types of controllers and on many different types of electronic game devices without using a mechanical switching cartridge for each game permutation. The invention adapts a signal on both the controller 10 and base transceiver 12 end of the game controller connection and provides for more generic controller input/output configurations. The invention can support multiple controllers and contains innovations unique to the wireless gaming environment such as channel palettes, synchronization, and bonding. The invention provides a feature negotiation process which allows the system to adapt to new controller types and multi-controller configurations, for multiple hosts and multiple base transceivers and multiple electronic game device types. It also provides synchronization between base transceivers, simultaneous polling volleys, and mediation for different electronic game device types.

The invention also supports controller input/output functions and programming capabilities and interfacing between the controller and an electronic game device with the following characteristics:

1) low packet transmission latency with stringent real time performance;
2) noise characterization and circumvention;
3) error detection protocols;
4) low overhead, low cost, and low power consumption;
5) clear channel seeking, frequency hopping;
6) multiple function controller support;
7) multiple vendor/cross-platform controller and electronic game device support;
8) multiple point base transceiver to multiple controllers support;
9) support for dynamically bonding controllers to base transceivers with a built in feature negotiation step to allow the base transceiver to learn controller attributes; and
10) multiple layer (RF (physical), adaptation, and application) system, allowing new features to be easily introduced on a per layer basis without interfering with features of other layers.

In different embodiments of the invention, the controller and base transceiver can share a common address transmitted as one of the signals. The system can support multipoint RF wireless communications between a base transceiver and subtended controllers where such base transceivers and controllers can be of multiple types and can dynamically bond with and negotiate to determine supported capabilities. The system can include a layered architecture that ensures compatibility between linked controller and electronic game devices through a protocol independent of both the controller and the electronic game device, and the layered framework can ensure compatability between a linked controller and electronic game device through a protocol independent of both the controller and the electronic game device. The system can comprise first and second controllers each transmitting RF wireless signals respectively to first and second base transceivers, and each microprocessor in each first and second base transceivers can dynamically synchronize first and second base transceiver inter-transceiver and controller-to-transceiver transmission events. The controller and base transceiver and electronic game device are supportable with game-related data and firmware updates.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A wireless system for video game control comprised of a base transceiver engaged with an electronic game device where:

the base transceiver communicates wirelessly with one or more wireless controllers concurrently;

the controllers are capable of translating user input into digitally coded data and sending this data to the base transceiver;

the base transceiver is capable of relaying the data received from the controllers to the electronic game device thus allowing the users to remotely control the electronic game device;

the wireless communication can be bidirectional to allow feedback information to be delivered from the electronic game device to the controllers;

the bi-directional wireless communication, when present, can be either half duplex or full duplex;

the base transceiver selects a channel palette of one or more channels to be used for wireless communication between the base transceiver and all controllers;

the channel palette constitutes the collection of channels that the system uses to implement a frequency hopping pattern if more than one channel exists in the channel palette;

the base transceiver and the controllers each check the integrity of all received packets using a checksum method and maintain a ratio of good versus damaged packets to characterize the quality of each channel;

the base transceiver and the controllers each monitor the received signal strength of incoming packets to help identify poor channels;

the base transceiver or the controllers or both collect and store RF channel performance data such as signal strength and channel quality;

the controllers can send said stored RF channel performance data to the base transceiver;

the base transceiver can adjust the channel palette to replace bad channels with better channels which it finds by periodically trying new channels, and by analyzing and interpreting its own measured channel performance data, or channel performance data received from the controllers, or both;

the base transceiver can adjust the number of channels in the channel palette as the number of available good channels varies;

the channel palette adjustments can be used to dynamically optimize communication reliability by avoiding the use of bad channels suffering from interference, obstacle attenuation, multipath nulls, other problems, or any combination of these problems;

the base transceiver uses synchronous time domain multiplexing techniques to communicate with each controller by specifying a synchronous time slot during which each controller can communicate with the base transceiver;

the frequency hopping and synchronous time domain multiplexing techniques are used in conjunction with one another to help ensure that packets are received intact on the first attempt thus circumventing the need to retransmit damaged packets and thereby achieving a small system latency with a small standard deviation and therefore minimizing the user's perceived control lag;

the controllers can use the synchronous time domain multiplexing to save power by turning off their radio transceivers when they are not receiving or transmitting data;

the base transceiver can use the synchronous time domain multiplexing to save power by turning off its radio transceiver when it is not receiving or transmitting data.

2. A system as in claim 1 which supports multiple base transceivers which communicate between each other and coordinate the use of channels and timeslots so as to not cause interference with one another and where:

coordination is employed to ensure that no two devices will transmit on the same channel at the same time, and;

the receiver swamping problem is circumvented by synchronizing the time domain multiplexing cycle of each base transceiver so that they all transmit at the same time.

3. A system as in claim 2 which is capable of having each controller dynamically bond to any one of a variety of different base transceivers at any given time and where each controller incorporates controls that, in a multi-base transceiver environment, enable it to select which base transceiver it is bonded with.

4. A system as in claim 1 where the system is further capable of having each controller dynamically bond to any one port on a base transceiver at any given time and where:

the address information that creates the logical link between controller and base transceiver is dynamically generated and shared between the two devices via a radio transmission so that the user does not have to mate a controller to a base transceiver by manually setting addresses;

the base transceiver has one or more logical wireless ports and the controller incorporates controls for selecting which of these ports the control device is bonded to and where said logical ports can be mapped by the base transceiver onto electronic game device control ports corresponding to player 1, player 2 and so forth;

bond indicators on the base transceiver or controllers or both provide a visual indication to the user regarding which logical port on that base transceiver each controller is bonded with.

5. A system as in claim 1 where in order to further improve reliability while maintaining low latency, wireless data is sent using direct sequence spread spectrum techniques which enables the receiving side to correct bit errors caused by communication problems.

6. A system as in claim 1 where in order to further improve reliability while maintaining low latency, the base transceiver implements an antenna that receives and transmits radio signals in a plurality of polarizations to maintain a consistently high radio frequency signal margin regardless of the physical orientation of each controller.

7. A system as in claim 1 where in order to further improve reliability while maintaining low latency, the base transceiver or controllers or both are implemented using a processor or microcontroller incorporating multiple hardware threads to ensure predictable handling of real time events.

8. A system as in claim 1 where the base transceiver is either a device that is externally connected to the electronic game device or a module that is built into the electronic game device, computer system, television or other appliance.

9. A system as in claim 1 where the base transceiver is implemented with a single radio transceiver to communicate with one or more controllers.

10. A system as in claim 1 where in order to further reduce latency, the synchronous time domain multiplexing of said wireless game control system is synchronized with the polling cycle of the electronic game device that is engaged with the base transceiver.

11. A system as in claim 1 that allows for the upgrade of the firmware of the controllers by downloading the new firmware from the base transceiver via the RF wireless link and where the firmware upgrade can be made available to the base transceiver via plug in media or by the engaged electronic game device which in turn can receive it from a memory card device, game media such as a cartridge or compact disk, or a connection to the internet.

12. A system as in claim 1 that allows for the upgrade of the firmware of the controllers by downloading the new firmware from a hardware expansion module or upgrade port physically located on the controller.

13. A radio frequency wireless system for remote operation of an electronic game device where:

the system is comprised of two types of devices:
 a base transceiver comprised of two distinct sub-systems where one provides an interface to an engaged electronic game device and the other provides a radio frequency communication interface to one or more wireless remote controllers;
 one or more wireless controllers each comprised of two distinct sub-systems where one provides a user interface to accept input from and deliver feedback to a user and the other provides a radio frequency communication interface to said base transceiver;

the system is designed to enable cross platform compatibility where:
 any given controller can bond to any base transceiver and provide seamless functionality of commonly supported features where each base transceiver may be designed to interface to a unique brand or model of electronic game device;

any given base transceiver can bond to any controller and provide seamless functionality of commonly supported features where each controller may be designed with a unique user interface or a unique physical layout of user interface elements;

each base transceiver contains a set of digitally stored records consisting of one record for each input sensor that said engaged electronic game device is capable of receiving data for and another set of digitally stored records containing one record for each user feedback mechanism that said electronic game device is capable of sending control data for;

each controller contains a set of digitally stored records consisting of one record for each input sensor that said controller has and another set of digitally stored records containing one record for each user feedback mechanism that said controller has;

each record contains information about the associated input sensor or user feedback mechanism including the type of the sensor or mechanism and the number of data bits associated with the sensor or mechanism;

each base transceiver and each controller are capable of negotiating a common set of user input sensors and user feedback mechanisms by identifying matching records;

the record matching is performed in a number of passes starting with very strict matching requirements and with subsequent passes being performed on the remaining unmatched records using less strict matching criteria in an attempt to match all fields;

translation information is generated from the results of the record matching process to describe how the data described by one record should be manipulated to make it conform to the data format required by the matched record;

the translation information can include such details as sign conversions, logic conversions, and data resolution scaling instructions;

each controller is capable of using the generated translation information to structure data packets containing data obtained from its input sensors and manipulated to be compatible with the data types acceptable to the electronic game device engaged with the base transceiver;

each controller is capable of sending said manipulated data packets using radio wireless communication to the base transceiver to which it is bonded which in turn delivers them to the engaged electronic game device as though they had been delivered from a physically attached wired video game controller so as to control or manipulate the game;

each base transceiver is capable of using the generated translation information to structure data packets containing data obtained from the engaged electronic game device and manipulated to be compatible with the data types acceptable to the feedback mechanisms on the controller to which it is addressed;

each base transceiver is capable of sending the manipulated data packets using radio wireless communication to the controller to which they are addressed which in turn uses them to control the user feedback mechanisms of the controller as though they were wired to and being directly controlled by the electronic game device.

14. A system as in claim 13 wherein the digitally stored records also contain body mapping information used to identify which part of the user's body is intended to actuate the input sensor or receive feedback from the associated feedback mechanism.

15. A system as in claim 14 that allows for the upgrade of the firmware of the controllers by downloading the new firmware from the base transceiver via the RF wireless link and where the firmware upgrade can be made available to the base transceiver via plug in media or by the engaged electronic game device which in turn can receive it from a memory card device, game media such as a cartridge or compact disk, or a connection to the internet.

16. A system as in claim 14 that allows for the upgrade of the firmware of the controllers by downloading the new firmware from a hardware expansion module or upgrade port physically located on the controller.

17. A system as in claim 13 that allows for the upgrade of the firmware of the controllers by downloading the new firmware from the base transceiver via the RF wireless link and where the firmware upgrade can be made available to the base transceiver via plug in media or by the engaged electronic game device which in turn can receive it from a memory card device, game media such as a cartridge or compact disk, or a connection to the internet.

18. A system as in claim 13 that allows for the upgrade of the firmware of the controllers by downloading the new firmware from a hardware expansion module or upgrade port physically located on the controller.

\* \* \* \* \*